United States Patent [19]
Carlile et al.

[11] Patent Number: 6,164,974
[45] Date of Patent: Dec. 26, 2000

[54] EVALUATION BASED LEARNING SYSTEM

[75] Inventors: John B. Carlile; Narath Carlile, both of Kingston, Canada

[73] Assignee: Softlight Inc., Ontario, Canada

[21] Appl. No.: 09/049,749

[22] Filed: Mar. 27, 1998

Related U.S. Application Data

[60] Provisional application No. 60/042,095, Mar. 28, 1997.

[51] Int. Cl.[7] .............................. G09B 3/00; G09B 7/00; G09B 19/00
[52] U.S. Cl. ........................ 434/322; 434/118; 434/323; 434/327; 434/335; 434/336; 434/350; 434/354; 434/362
[58] Field of Search ..................................... 434/118, 322, 434/323, 327, 335, 336, 350, 354, 362

[56] References Cited

U.S. PATENT DOCUMENTS

| | | |
|---|---|---|
| 4,798,543 | 1/1989 | Spiece . |
| 4,968,257 | 11/1990 | Yalen . |
| 5,002,491 | 3/1991 | Abrahamson et al. . |
| 5,176,520 | 1/1993 | Hamilton . |
| 5,211,563 | 5/1993 | Haga et al. . |
| 5,241,671 | 8/1993 | Reed et al. ............................... 395/600 |
| 5,310,349 | 5/1994 | Daniels et al. . |
| 5,318,450 | 6/1994 | Carver . |
| 5,372,507 | 12/1994 | Goleh . |
| 5,377,997 | 1/1995 | Wilden et al. . |
| 5,437,555 | 8/1995 | Ziv-El . |
| 5,441,415 | 8/1995 | Lee et al. . |
| 5,577,919 | 11/1996 | Collins et al. . |
| 5,601,436 | 2/1997 | Sudman et al. . |
| 5,797,753 | 8/1998 | Griswold et al. ........................ 434/322 |
| 5,813,863 | 9/1998 | Sloane et al. ............................ 434/236 |

FOREIGN PATENT DOCUMENTS

| | | |
|---|---|---|
| 0 399 667 | 11/1990 | European Pat. Off. . |
| 0 665 523 | 8/1995 | European Pat. Off. . |
| 0 710 943 | 5/1996 | European Pat. Off. . |
| WO 96/21212 | 11/1996 | WIPO . |

*Primary Examiner*—John Edmund Rovnak
*Attorney, Agent, or Firm*—Heslin & Rothenberg, P.C.

[57] ABSTRACT

An evaluation based learning system (EBLS) is provided which is used by authors, teachers, students and education administrators for the development of courses, the teaching of courses, the studying of courses and the administration of information and data relevant to the courses. The EBLS provides an efficient authoring, teaching and learning environment wherein a database of questions and answers are linked to a textbook to facilitate the learning and evaluation process of students studying a textbook.

18 Claims, 12 Drawing Sheets

EVALUATION BASED LEARNING SYSTEM

CROSS-REFERENCE TO RELATED APPLICATION

This application is a continuation-in-part of applicants' copending U.S. Provisional patent application no. 60/042,095 filed Mar. 28, 1997.

FIELD OF THE INVENTION

An evaluation based learning system (EBLS) is provided which is used by authors, teachers, students and education administrators for the development of courses, the teaching of courses, the studying of courses and the administration of information and data relevant to the courses. The EBLS provides an efficient authoring, teaching and learning environment wherein a database of questions and answers are linked to a textbook to facilitate the learning and evaluation process of students studying a textbook.

BACKGROUND OF THE INVENTION

Teaching is a skill and an art which has developed and evolved through the ages. Generally, within an education system, there are teachers who present, teach and test students on course materials, students who receive and learn course material and who are subsequently tested, authors who prepare and organize course material and administrators who control and direct the interaction between authors, teachers and students.

In the past, an author would prepare course material, normally in the form of a textbook containing printed information. An administrator would receive and distribute the textbook to teachers, the teachers would teach material within the textbook to students, prepare and administer exams to the students and students would study the course material and take exams set by the teachers.

In the past, authors may include questions relating to sections of text to assist teachers in teaching the course and setting exams for the course. Alternatively, teachers would prepare questions relating to the textbook for study purposes or for setting exams wherein a student could use these questions as a component in the process of studying and learning a course.

However, the processes of authoring, teaching and learning have hereto before not been unified. In the past, while questions which have been prepared by an author or teacher can be used by a student to study progress in a course, these questions cannot be efficiently used by a student to facilitate-assessment of learning. Specifically, therefore, there has been a need for a system wherein a textbook contains both questions and answers relating to a course and where those questions and answers are linked to specific sections of the text of a course to create a library of questions, answers and links for a specific text. Such as system advantageously provides a teacher the ability to teach a course wherein questions relevant to the course are immediately and efficiently available to the teacher for setting homework or exams, and to the student for studying a course or for taking exams. The efficient linkages between the author of a course, the teacher of a course and the students taking the course also provides an efficient system for evaluation of the learning process through the ability to track the progress of a student in learning the material of a course.

Accordingly, there has been a need for an evaluation based, computer aided, authoring, teaching and learning system to enhance the ability of authors, teachers and students to prepare, teach and learn course material.

For authors, there has been a need for a system having a text editor that can be used to set up a multi-media (print, graphics, audio and video), multi-levelled textbook. In addition, there has been a need for a system which enables the development of an evaluation system by the author wherein a library of questions/answers can be developed covering the content of the textbook wherein the questions/answers are individually linked to specific components of the textbook. Upon the development of such a course, there has been a need for a system wherein the course can be easily distributed to teachers, administrators and students for use on computer systems.

For students, there has been a need for a system which enables the student to study the textbook and then set-up and take a self-examination test on the textbook, wherein upon completion of the test, the system will immediately mark the test, provide the test score and provide the student with the ability to review the test results with a link to the textbook showing the section of the textbook containing information in the context of the correct answer.

Furthermore, there has been a need for a system wherein statistics relating to the student's performance on particular sections of the textbook can be readily obtained and analysed to provide information respecting the progress of the student for both sections of or the entire course, thus allowing students to progress at their own pace with a quantitative assessment of their progress.

For teachers, there has been a need for a system enabling exams to be efficiently set-up, distributed and marked with the added ability to obtain reports respecting both individual and class progress. Still further, there has been a need for a system giving teachers the ability to identify individuals or students who are having difficulty with a particular area wherein clarification can be offered to those students without holding back other students thereby enabling the education process to be individualized.

In addition, there has been a need for a system wherein the course may contain multi-levelled elements to facilitate learning. More specifically, there has been a need for a system wherein an author may produce a textbook including, for example, a general outline which may be used for more generalized study, a precis introducing concepts and ideas in greater detail and a full-text version for in-depth study each with associated questions/answers and links.

For administrators, there has been a need for a system which allows for the efficient set-up and distribution of computer textbook courses over computer systems and the subsequent collection and processing of information pertaining to the use of the system.

A review of the prior art has indicated that such a system has not been developed. U.S. Pat. No. 4,798,543 (issued Jan. 17, 1989) is directed to an interactive training method and system for the selective presentation of audio and video training program information to learner operators. This patent describes a system which includes text/video/audio display of information and a system that enables an instructor to evaluate the progress of a student.

Other patents include U.S. Pat. No. 4,968,257 (issued Nov. 6, 1989) describing a computer based teaching apparatus which includes a specific apparatus and joystick for interfacing with a user; U.S. Pat. No. 5,002,491 (issued Mar. 26, 1991) describing an interactive classroom system enabling teachers to administer and evaluate tests over a computer system; U.S. Pat. No. 5,176,520 (issued Jan. 5, 1993) describing a computer assisted instructional delivery system and method enabling both a teacher and student to share work space around a classroom over a computer network with specific hardware; U.S. Pat. No. 5,372,507 (issued Dec. 13, 1994) describing a machine aided tutorial method; U.S. Pat. No. 5,441,415 (issued Aug. 15, 1995) describing a computer aided learning method and apparatus; U.S. Pat. No. 5,577,919 (issued Nov. 26, 1996) describing a method and apparatus for automated learning and performance evaluation; U.S. Pat. No. 5,318,450 (issued Jun. 7, 1994) describing a multi-media distribution system for instructional materials; and, U.S. Pat. No. 5,437,555 (issued Aug. 1, 1995) describing a remote teaching system.

SUMMARY OF THE INVENTION

In accordance with the invention, there is provided an evaluation based learning system (EBLS) comprising:
  a course, the course including:
    at least one multimedia element;
    at least one identifier within the multimedia element identifying specific information of the multimedia element;
    at least one connected question and course answer relating to the specific information of an identifier wherein the connected question and course answer are linked to at least one identifier.

In further embodiments of the invention the course includes a computer database of connected questions and course answers operatively connected to respective identifiers and/or the multimedia element is selected from any one of or a combination of a text element, audio element, video element or graphic element.

The EBLS may also include a student module operatively linked to the course, the student module enabling a student to study and answer at least one connected question from the course, the student module including:
  means for reviewing the multimedia element;
  means for accessing the connected question;
  means for submitting a student answer to the question; and
  means for comparing the student answer with the course answer to determine the correctness of the student answer.

The student module may also include means for reviewing the correctness of the student answer wherein the means for reviewing includes means for displaying the text of the multimedia element related to a connected question and/or means for taking a self-test exam from the database of connected questions and/or means for analysing a student's performance in a self-test exam.

The EBLS may also include a teaching module, the teaching module including:
  means for creating an exam from the database of connected course questions; and,
  means for distributing the exam to the student module.

In further embodiments, the teaching module includes means for analysing the performance of students on exams.

The EBLS may also include an authoring module for the creation of a course, the authoring module including means for creating a new course wherein the means for creating a new course includes:
  means for editing the at least one multimedia element;
  means for creating identifiers within the multimedia element;
  means for creating connected questions and course answers;
  means for linking a connected question and course answer to an identifier.

The EBLS may also include an administration module operatively linked to the course, the administration module including means for publishing and distributing the course and/or means for authorizing teachers to access the teaching module, means for enrolling students to the student module, means for receiving and processing grades from the teaching module.

In a more specific embodiment, the EBLS may include a student module, teaching module and authoring module operatively linked to the course,
  the student module including:
    means for reviewing the multimedia element;
    means for accessing the connected question;
    means for submitting a student answer to the question; and
    means for comparing the student answer with the course answer to determine the correctness of the student answer;
  a teaching module including:
    means for creating an exam from the database of connected course questions; and,
    means for distributing the exam to the student module; and,
  an authoring module including
    means for creating or editing a course wherein the means for creating or editing a course includes:
      means for editing the at least one multimedia element;
      means for creating identifiers within the multimedia element;
      means for creating connected questions and course answers; and,
      means for linking a connected question and course answer to an identifier.

The invention also provides a question data course comprising a textbook containing a plurality of questions and answers specifically linked to sections of the textbook wherein the number of questions and answers relative to the total number of facts/opinions within the textbook exceeds 50% of the total number of facts/opinions within the textbook as independently determined.

BRIEF DESCRIPTION OF THE DRAWINGS

These and other features of the invention will be more apparent from the following description in which reference is made to the appended drawings wherein.

DETAILED DESCRIPTION OF THE INVENTION

Overview

Figure 1:
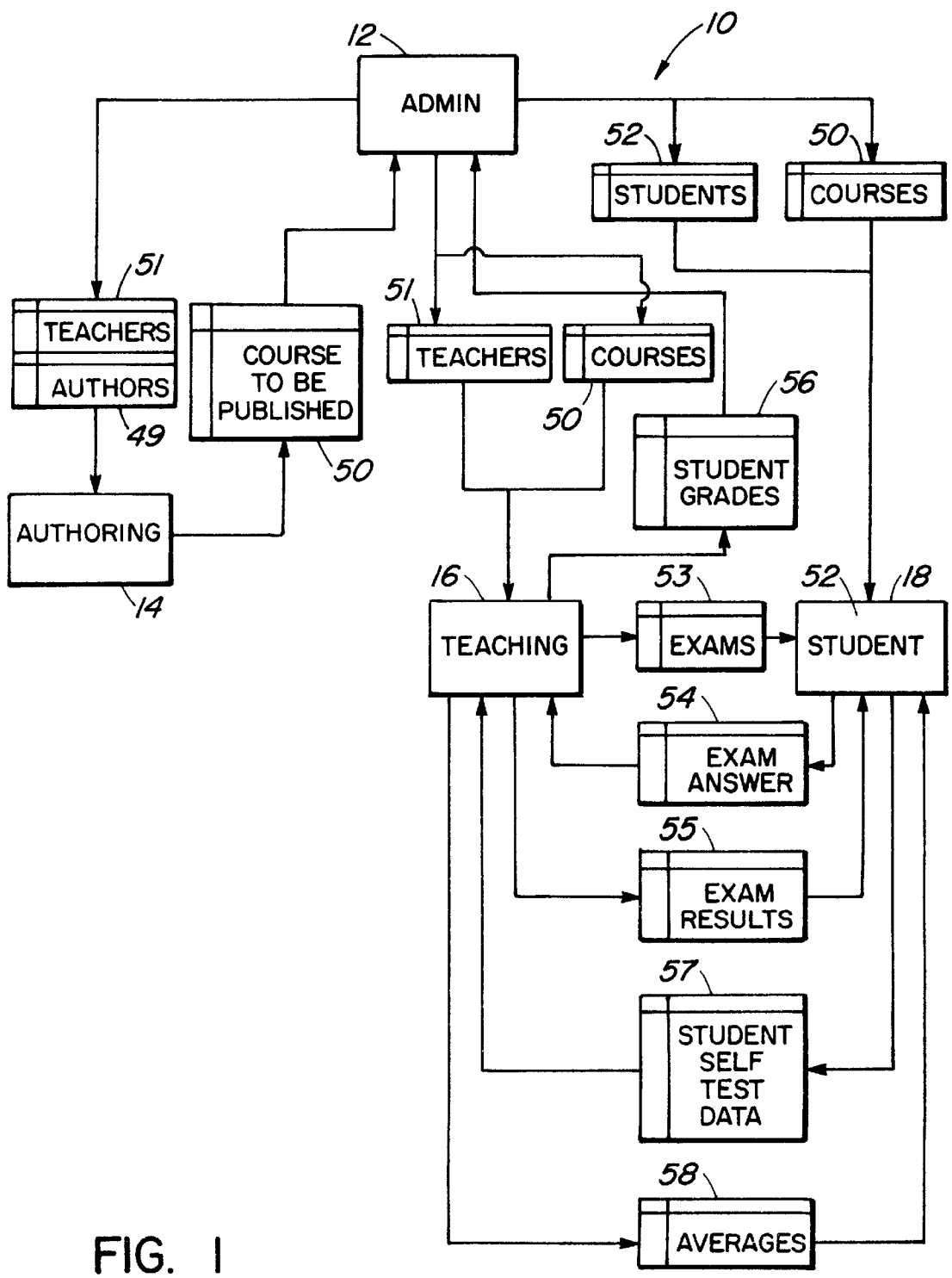
FIG. 1 is an overview of an Evaluation Based Learning System in accordance with the invention.

In accordance with the invention, an evaluation based learning system (EBLS) 10 is described. The EBLS provides an efficient teaching and learning environment to education administrators, course authors, teachers, and students. The system 10 generally includes a number of modules including administration 12, authoring 14, teaching 16 and student 18 modules as well as numerous sub-modules providing functionality to each of the main modules.

Figure 2:
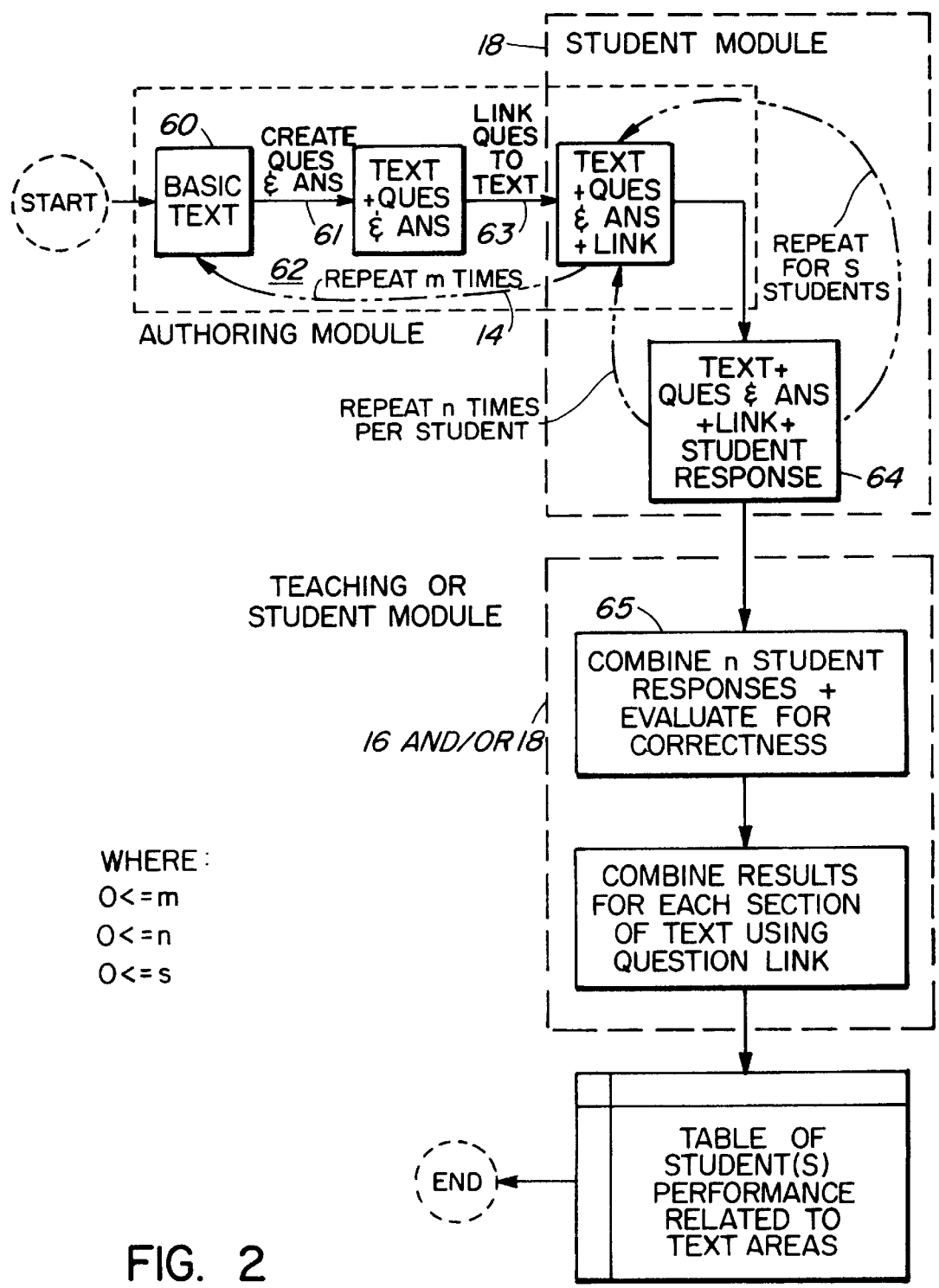
FIG. 2 is an overview of the interaction between the authoring, teaching and student modules.

The EBLS, as shown in FIGS. 1 and 2, allows the administrator, author, teacher and student entities within an education system to efficiently work within the education process, by specifically linking the functions of administrators, authors, teachers and students together to provide a streamlined administration system for education administrators, an effective authoring system for authors creating courses for teachers to teach from and students to learn from, an effective teaching system for teachers to teach from, set exams and evaluate students' performance and an effective learning system for students to study a course and take exams from.

Figure 3:
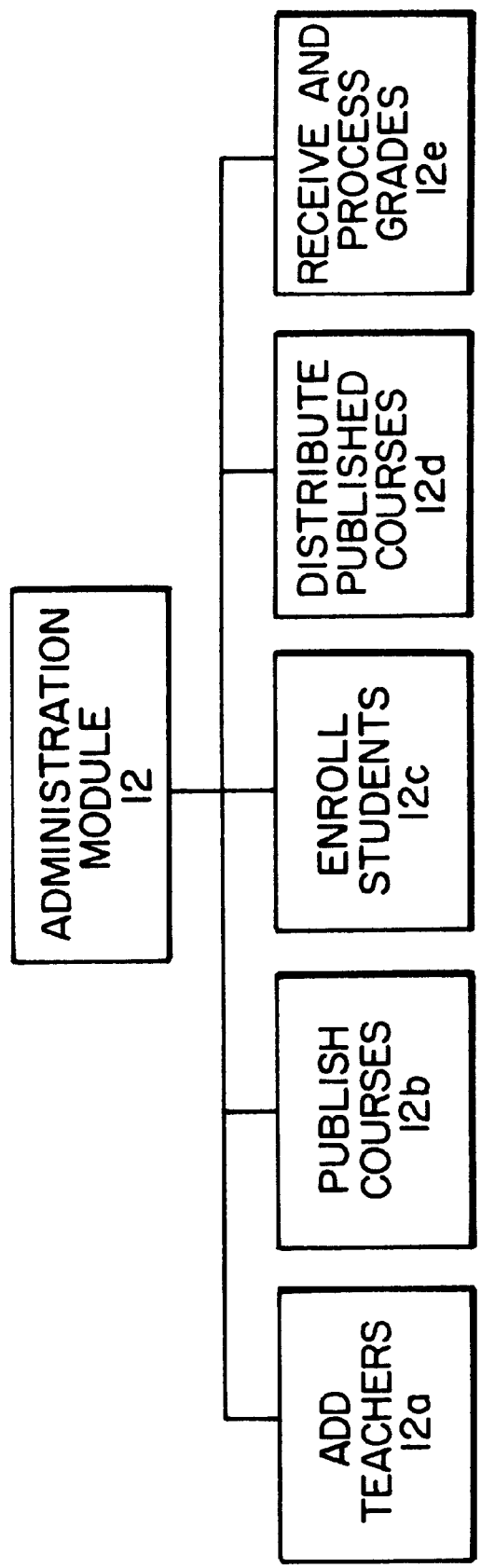
FIG. 3 is a block diagram showing sub-modules of the Administration Module in accordance with the invention.

More specifically, and with reference to FIGS. 1 and 3, the administration module 12 provides administrative fiction to the EBLS including adding teachers, publishing courses, enrolling students, distributing published courses and receiving and controlling overall student grades. The administration module interacts with the authoring module 14 which enables the creation of courses 50 by authors 49 and teachers 51 which may thereafter be published and used by teachers 51 and students 52 within the system 10. The administration module 12 also interacts with the teaching module 16 which enables a teacher 51 to access a published course 50 and set exams 53 for students 52 and with the student module 18 for enrolling students 52 and setting courses 50. The teaching module 16 interacts with the student module 18 which enables students 52 to access courses 50 and take exams 53. The student 52 provides an answer to exam questions 54 from which exam results 55 and student grades 56 are obtained. In addition, a student may self-test 57 to obtain specific results/averages 58.

With reference to FIG. 2, the basic functionality between the authoring 14, student 18 and teaching 16 modules is shown. Within the authoring module 14, an author uses text 60 to create a question 61 and an answer 62 to that question, the question 61 and answer 62 both relating to a specific portion of text within a document 60. The question 61 is then linked 63 to specific text within the document 60. The author may repeat this process in order to create a library of questions 61, answers 62 and links 63 to text within a document 60.

Within the student module 18, the student studies the text of the document 60. Questions 61 relating to the text of the document 60 as formulated from within the authoring module may be selected (by either a teacher or a student) and answered by the student. The student's answers 64 to the questions 61 are checked for correctness against the author's answers 62 and form the basis of an evaluation 65 of the student's performance for the questions answered. Additional evaluations 66 may be conducted to determine the specific performance of an individual student or a group of students for a given section of course material and/or overall course material.

A more detailed description of the functionality of the administration, authoring, teaching and student modules and their sub-modules follows as may be implemented on a computer system and/or network as shown in the Figures. With respect to the Figures, square boxes generally show executable modules while rounded boxes indicate displayed data.

Administration Module 12

With reference to FIGS. 1 and 3, and as indicated above, the administration module (box 12) includes a number of sub-modules including adding teachers to the EBLS (box 12a), publishing courses created by authors (box 12b), enrolling students (box 12c), distributing published courses (box 12d) to teachers and students and receiving and processing student grades (box 12e).

The administration module 12 may be coupled with other modules for networking or distribution purposes or it may have a stand-alone interface. For example, the administration module may be provided with a networked "academic" interface or alternatively a stand-alone "teacher" interface. In each case, the administrative module 12 exists as a distinct and executable module with a specific interface and inputs for its intended use. For example, the academic interface may provide an interface appropriate for distribution and/or operation of the EBLS to/with schools/universities. The teacher interface may provide an interface appropriate for individual teachers to operate the EBLS in a more localized environment.

Authoring Module 14

The authoring module 14 (FIG. 4) generally allows an authorized author to create a new course or modify an existing course. A course consists of at least one multimedia element such as text, audio, video and/or graphical images. In most courses, the course will be predominantly text, however, courses incorporating strictly audio and/or video could be employed. In the case of a course containing text, the text may comprise a number of sections as per a document normally created through word-processing including, for example, a table of contents, an outline, precis, glossary, dictionary and/or index in addition to the full text of the document. In accordance with the invention, a course will also consist of questions and answers to those questions in addition to one or more links from the questions to the multimedia element (FIG. 2). A course may also include links from individual sections to other sections of the multi-media element, for example from the precis to the full text or from the contents to the precis and/or the full text.

The creation of a course is accomplished by an author as may be authorized by the administration module 12.

Figure 4:
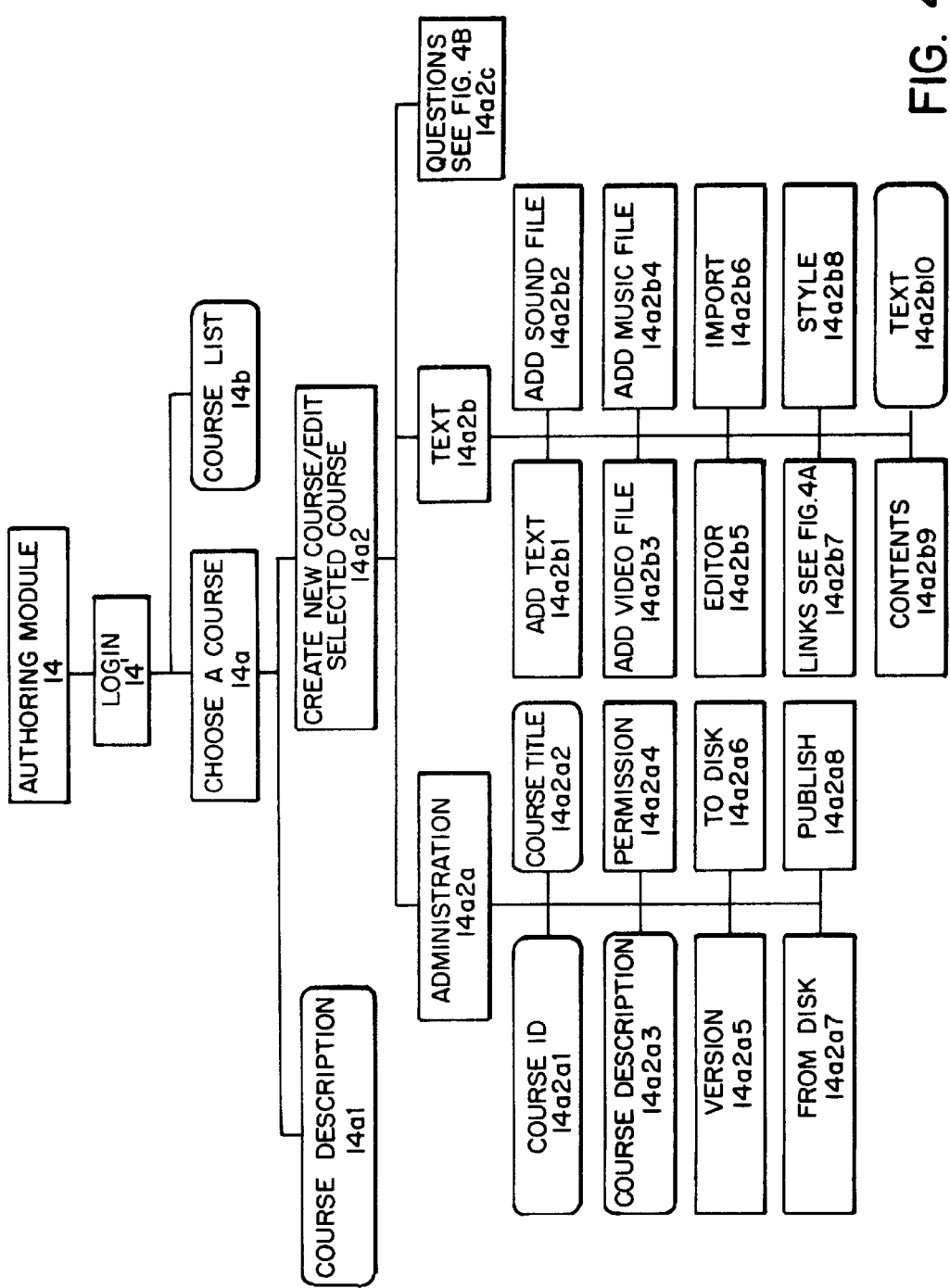
FIG. 4 is a block diagram of the Authoring Module in accordance with the invention.

The authoring module 14 can be defined further in terms of a number of sub-modules as shown in FIG. 4.

Login Module (box 14')

The login module (box 14') generally enables registered authors to gain excess to the authoring module 14 for the creation or modification of a EBLS course requiring entry of a user ID and password to obtain access.

Choose a Course (box 14a)

Once logged in, a list of courses (box 14b) shows courses available for editing. An author may select a previously created course for editing or initiate the creation of a new course. Highlighting or selecting a course from the list (box 14b) will preferably display a brief course description (box 14a1). Upon selection of a particular course for modification or initiation of the creation of a new course (box 14a2), further sub-modules may be executed enabling administrative properties to be created or modified (box 14a2a), text to be added to the course (box 14a2b) or questions to added to the course (box 14a2c).

Upon selection of the administrative sub-module (box 14a2a) course parameters may be created or modified through further sub-modules. These may include providing permission to other authorized authors to modify the course (box 14a2a4), allowing the user to manage different versions of the course (box 14a2a5), the ability to copy the course to a digital storage device (box 14a2a6), reading a course from a digital source (box 14a2a7) or publishing the course (box 14a2a8).

The administration sub-module (box 14a2a) may also display the course ID (box 14a2a1), the course title (box 14a2a2) and/or a course description (box 14a2a3).

Creating or Modifying a Course-Text Module (box 14a2b)

Within the text module (box 14a2b), an author initially creates or edits a multimedia document preferably using conventional multimedia document editors. For example, in the creation of a text document, the text module (box 14a2b) enables the author to add new text to the document (box 14a2b1) and optionally a new sound file (box 14a2b2), a new video file (box 14a2b3), and/or a new music file (box 14a2b4) to the course. An editor sub-module (box 14a2b5) provides standard word processing functionality for the author to edit the text of the course such as bold, italics, and/or underlining to displayed text.

The questions sub-module (box 14a2c) and explained in greater detail below enables the author to create questions relating to the text of the course.

Example of the Creation of a Text-based Course

For the purposes of illustration, the creation of a text based course proceeds as follows:

In the creation of a course relating to information concerning Amnesty International, a text document containing information about Amnesty International is created in accordance with normal word processing procedures. The text of the document relating to Amnesty International may be imported from an external source (box 14a2b6) or written by the author directly. The editor (box 14a2b5) will preferably include a series of menu options allowing the author to effectively and efficiently create the text of the course. Still further sub-modules allow for the management of pre-defined styles (box 14a2b8) for different text elements or allow for the management of table of contents data (box 14a2b9).

Creating Links Between Questions and Text

Figure 4A:
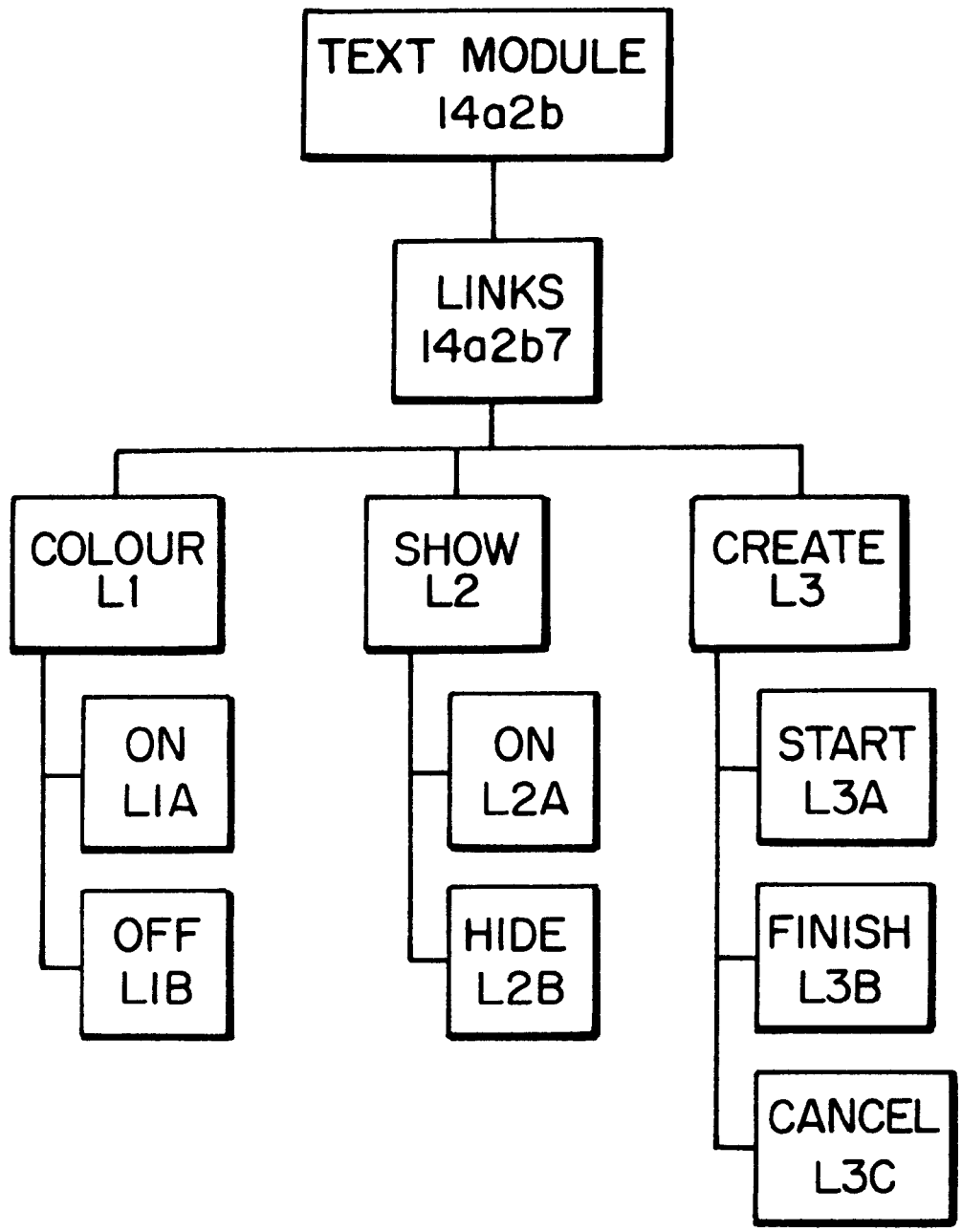
FIG. 4A is a block diagram of the text sub-module of the authoring module in accordance with the invention.
Figure 4B:
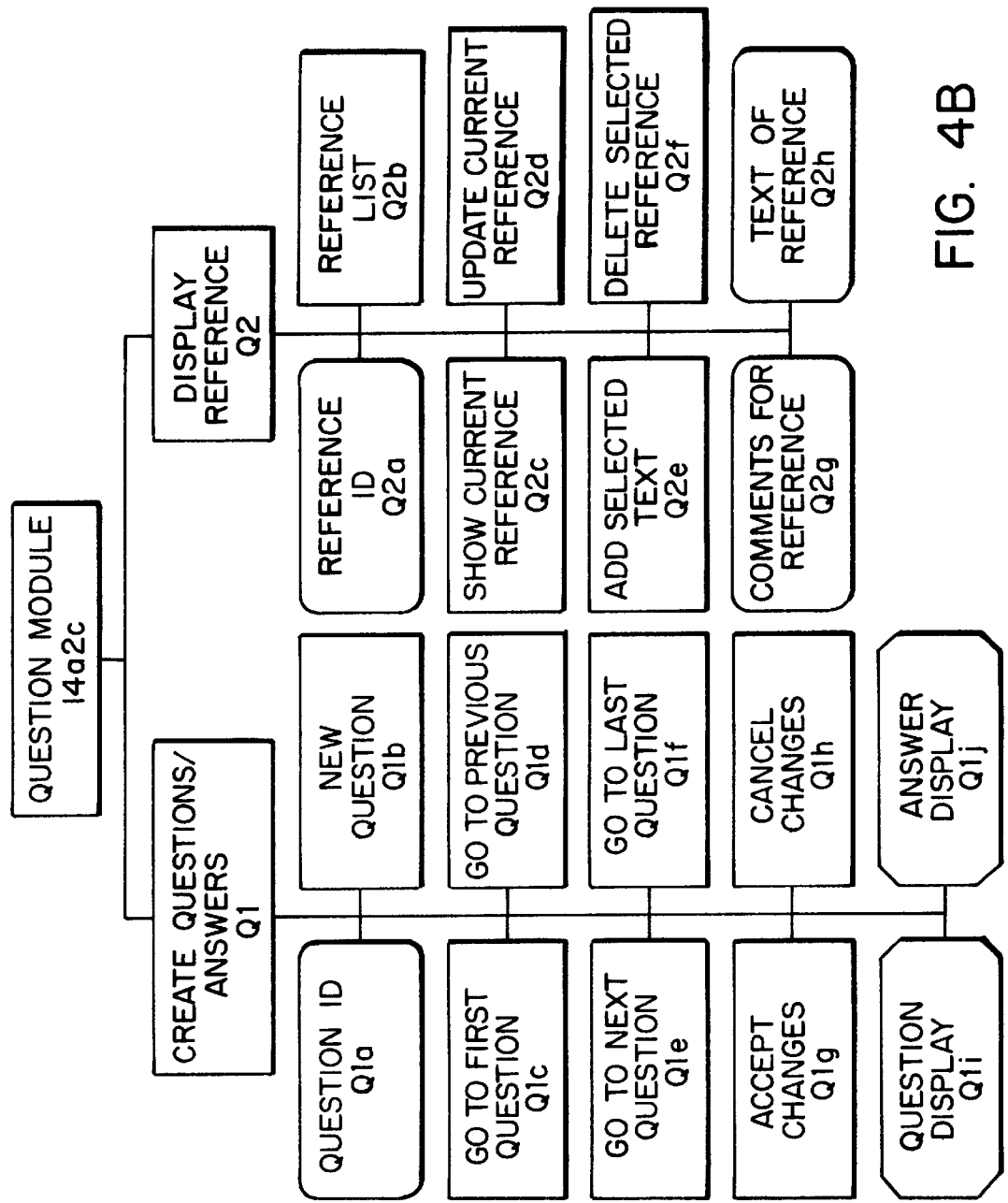
FIG. 4B is a block diagram of the question sub-module of the authoring module in accordance with the invention.

At the centre of the EBLS, is the ability of the author to create links between text and questions in a visually appealing and intuitive manner. This is enabled through the links sub-module (box 14a2b7) (FIG. 4a) and the questions sub-module (box 14a2c) (FIG. 4B). The links sub-module (box 14a2b7) (FIG. 4A) allows the introduction of colours (box L1) for highlighting the links and can be either active (box L1a) or inactive (box L1b). The creation of a link between questions and text proceeds as follows:

Step 1—Labelling Text as Having a Link

In the creation of a link between questions (described below) and text, the author, within the text of the course, highlights text and labels that text as containing a link to a single or series of questions.

For example, the text of the course "What is Amnesty International?" is identified as having a link, and thereafter carries a specific identifier, for example, link 232. The body of text is identified by a link number marking the beginning of the text and the same number marking the end of the text

232What is Amnesty International?232.

The creation and/or management of links is accomplished by execution of the links sub-module (box 14a2b7) specifically through execution of the create links sub-module (box L3) and sub-modules start (box L3a), finish (box L3b) or cancel (box L3c) the creation of marked text for linking.

Still further, within the links sub-module (box 14a2b7) the author can choose to show the links (box L2) through execution of an "on" sub-module (box L2a) or a "hide" sub-module (box L2b) respectively. Accordingly, if "on" is selected (box L2a), all links which have been created within the text will be visible and, alternatively, if "hide" (box L2b) has been selected all anchor links will be invisible.

Thus, a series of text within a document is marked as having links.

Step 2—Creating Questions Relevant to Labelled Text

Upon the creation of a number of link sites within the text, wherein each link is identified by a numerical destination, the author proceeds with the creation of a question through the question module (box 14a2c) (FIG. 4B).

The question module (box 14a2c) provides the author with the ability to create a question relevant to the text and, more specifically, to text which has been identified as having a link.

Accordingly, upon activating the question module (box 14a2c), the author may execute sub-modules allowing the creation of questions/answers (box Q1) and to display references (box Q2) which enables the creation of questions and answers relating to a reference.

Accordingly, an author may initiate the creation of a new question/answer (box Q1b) whereupon a question field (box Q1i) allows the author to enter a question, for example, "What does Amnesty International deal with?" and the answer to that question in an answer field (box Q1j). The create question/answer sub module (box Q10 may also display a unique identification number for that question (box Q1a).

Additional sub-modules allow the author to readily create and edit questions/answers such as a "go to first question" sub-module (box Q1c) allowing an author to immediately transfer to the first question, a "go to the previous question" sub-module (box Q1d) allowing an author to return to the previous question, a "go to the next question" sub-module (box Q1e) allowing an author to move forward to the next question, a "go to the last question"(box Q1f) allowing an author to move to the last question, an "accept changes to the question"sub-module (box Q1g) allowing an author to have changes in the question accepted, and a "cancel changes to the question" sub-module (box Q1h) allowing an author to cancel any changes made to a question.

With respect to the display reference sub-module (box Q2), the text of a reference is displayed (box Q2h) along with comments for that reference (box Q2g).

A question must have at least one reference which indicates the correct answer. This reference is known as the primary reference. The question may also have other references (for example, other references which indicate why other choices are incorrect). Each reference consists of a link to an area of the text, and may also have an optional comment. Further sub-modules within the reference display may allow for navigating between the primary and other references of the question.

The display reference sub-module therefore includes additional sub-modules such as reference list (box Q2b) allowing the selection and display of available references, show the current reference (box Q2c) allowing the display of the text of a selected reference, updating the current reference (box Q2d), adding selected text (box Q2e) and deleting the selected reference (box Q2f).

Furthermore, within the question module (box 14a2c), different styles of questions may also be incorporated within the EBLS depending on the particular course which the author wishes to create. For example, the author may choose to create a single word answer or a multiple choice answer style wherein the student is presented with a number of different pre-defined choices.

Step 3—Linking Questions and Answers to Text

In creating a single word answer, the author may propose a question

"What does Amnesty International deal with?".

A single word answer to the question may be "protection" which is entered into the answer display (box Q1*j*). A window displaying the text is also visible on the screen. The author may scroll through this window until the author reaches the specific text which indicates the correct answer. The author then highlights this text, and indicates (by pressing, for example, an add reference button, a hot key or selecting a menu option) that the highlighted text is a reference to the question. A link is then made between that area of text and the question. The author may add any number of references to a particular question in this way. After the author has added all the references, the author must set the primary reference. This is achieved by selecting the reference they wish to indicate as the primary reference from the reference list. The author then indicates that this is the primary reference (by pressing, for example, a primary reference button, a hot key or selecting a menu option).

Upon identifying the text with the relevant link, that is, the text containing the answer to the question, the question (box Q1*i*), the answer (box Q1*j*) and the link are connected.

Similarly, a multiple choice question and answer may be created whereby the author can create choices by entering choices for answers in the choice field which are then displayed as a list.

The author may scroll through questions which have been created and edit them as described above. In each case, as the author scrolls through the questions, the answer to that question and the link from the text containing the information relevant to the answer is displayed.

Thus, a series of questions with specific links to the text is developed. The text (box14*a*2*b*10) may consist of a number of levels to which different elements such as a table of contents, references, precis and/or an outline of the full text level can be added.

Once completed, the author can make the course available for publishing (box 14*a*2*a*8).

Teaching Module 16

Figures 1, 5:
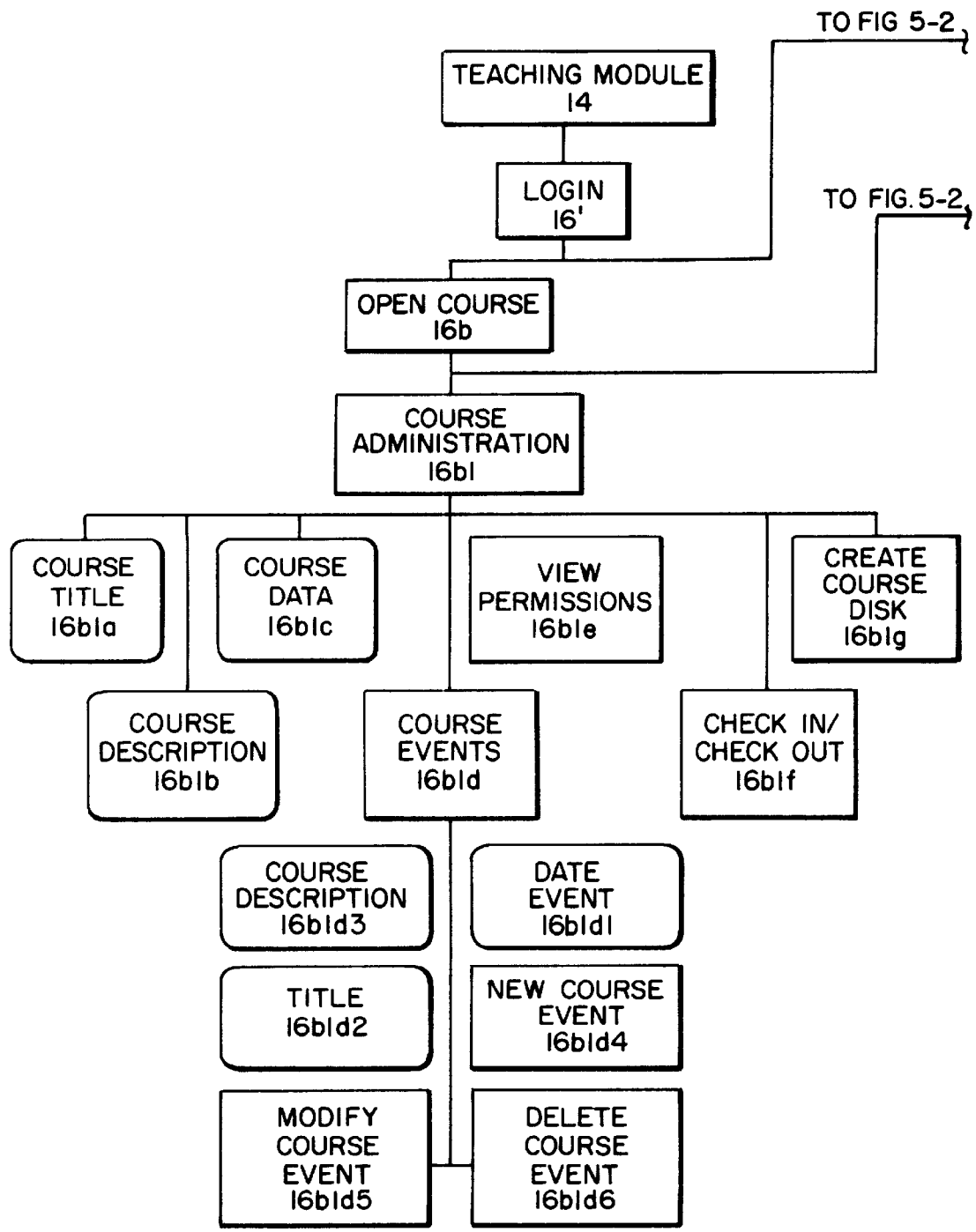
FIG. 5 is a block diagram of the teaching module in accordance with the invention.
Figures 2, 5:
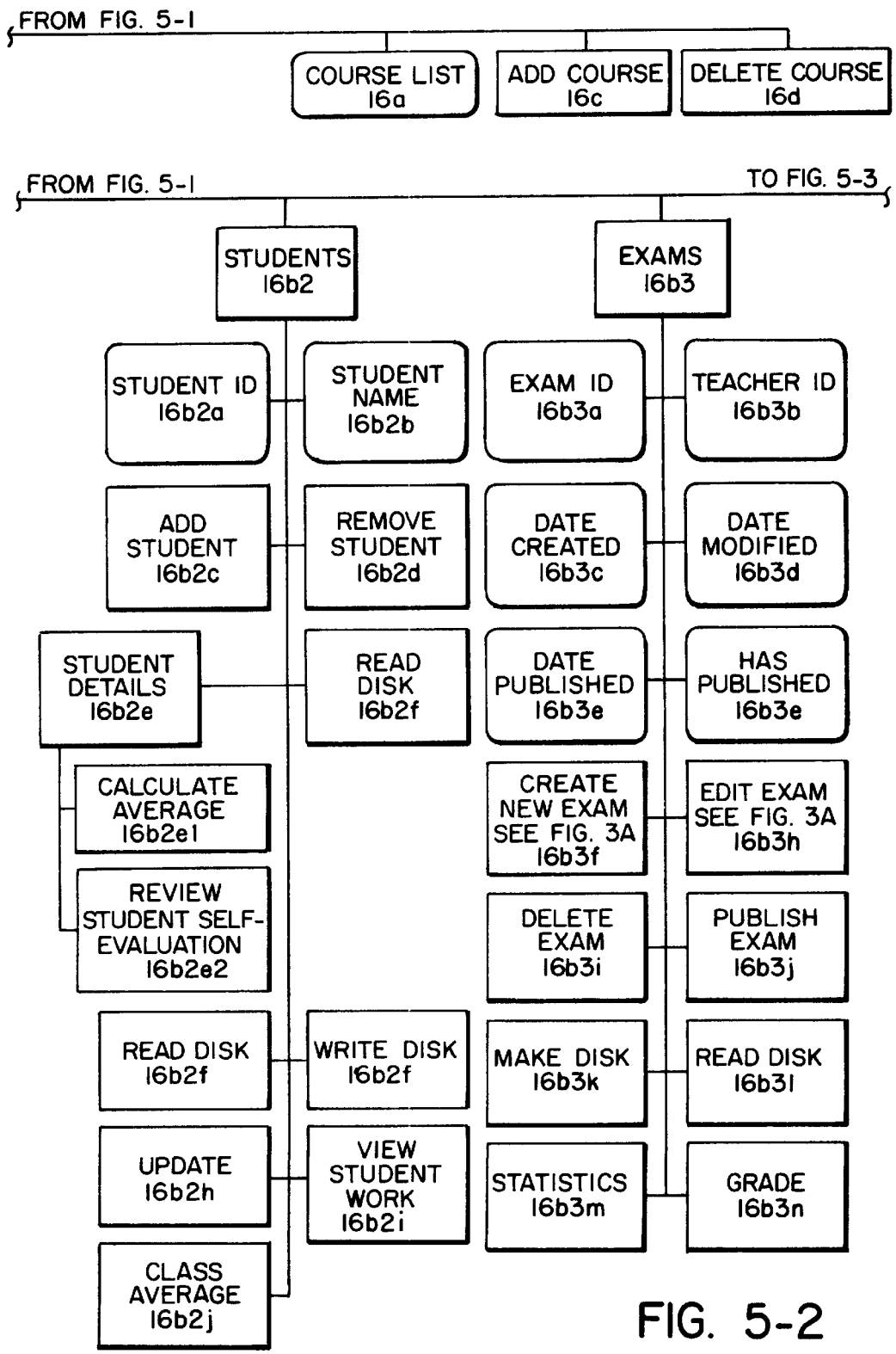
Figures 3, 5:
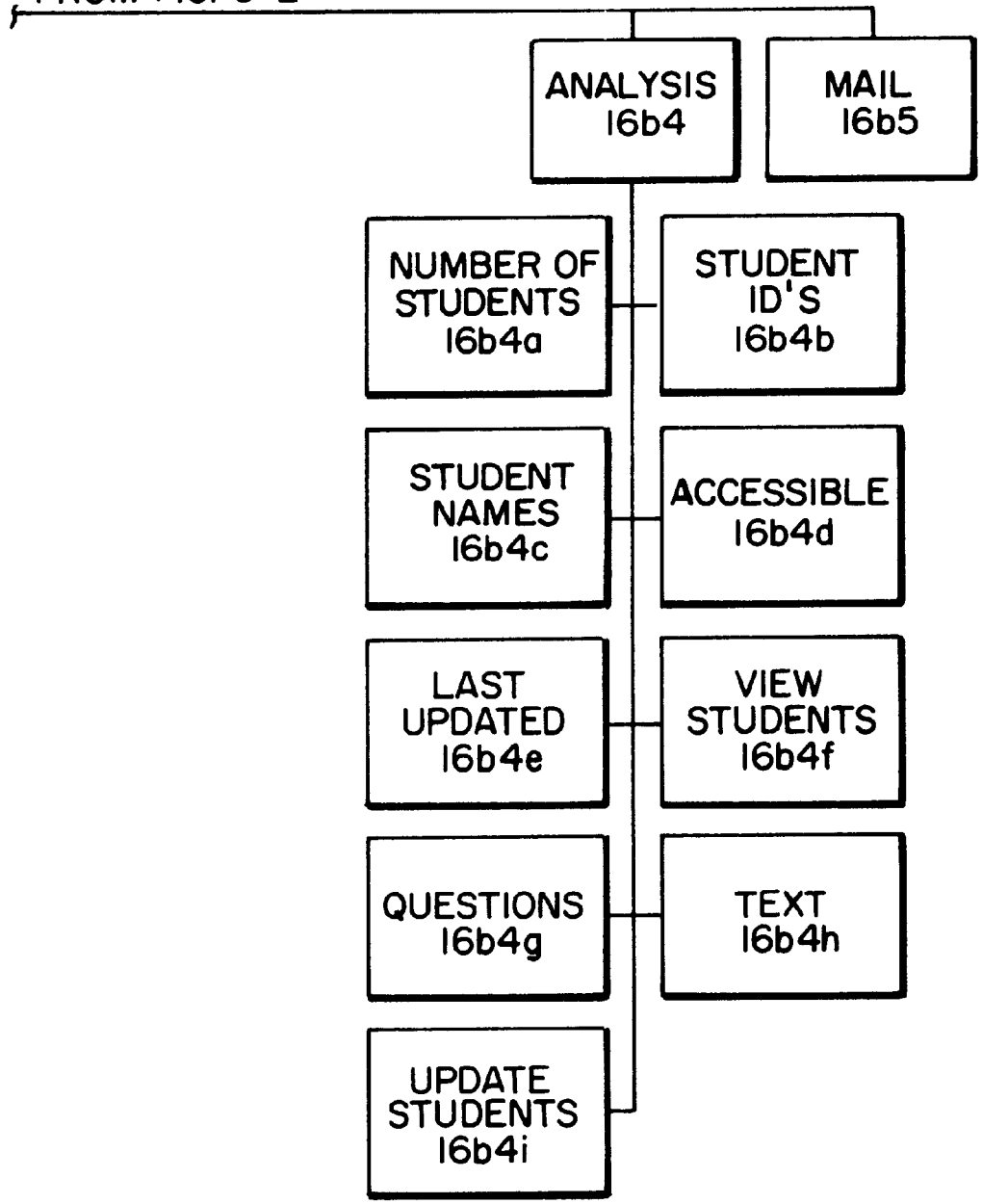

The teaching module (box 16) (FIG. 5) generally allows a teacher to choose from a course list (box 16*a*) a course they wish to teach, allow the creation and distribution of exams to students and allow the analysis of the course and students.

Initially, the teaching module (box 16) is accessible only to authorized teachers and accordingly, a teacher would be presented with an appropriate user name and password request (box 16') in order to gain access to a course.

Upon successful entry of a user name and password, the teacher may open a course (box 16*b*) from a course list (box 16*a*) listing courses which have been provided to that particular teacher. The teacher may also have the options of adding a new course (box 16*c*) to the selection list or deleting a selected course (box 16*d*) from the course list.

Upon opening a particular course, the teacher may select sub-modules providing course administration functions (box 16*b*1), student functions (box 16*b*2), exam functions (box 16*b*3), analysis functions (box 16*b*4) or mail functions (box 16*b*5).

With respect to course administration (box 16*b*1), data showing the course title (box 16*b*1*a*), a course description (box 16*b*1*b*) and other course data (box 16*b*1*c*) are preferably presented. Additional sub-modules providing course event functionality (box 16*b*1*d*), viewing permission functionality (box 16*b*1*e*), check in/check-out functionality (box 16*b*1*f*) and create course disk functionality (box 16*b*1*g*) may also be provided.

With respect to course events (box 16*b*1*d*), this sub-module will generally permit a teacher to create and edit course events. A course event is an event relating to the teaching of the course and may provide information relating to assignments, homework, and exams. The course events sub-module (box 16*b*1*d*) may display the date of an event (box 16*b*1*d*1), the title of an event (box 16*b*1*d*2), a course description (box 16*b*1*d*3) or allow the execution of further sub-modules allowing the creation of a new course event (box 16*b*1*d*4), the modification of an existing course event (box 16*b*1*d*5) or the deletion of a course event (box 16*b*1*d*6).

From the course administration sub-module (box 16*b*1), the teacher may also execute a view permission sub-module (box 16*b*1*e*) allowing the teacher to give other teachers permission to teach the course if a particular teacher has themself been given that authorization.

Still further, from the course administration sub-module (box 16*b*1), the teacher may also execute a check-in/check-out sub-module (box 16*b*1*f*) allowing the teacher to work on a course elsewhere and locking the course from further use until the teacher checks back in.

The teacher may also create a course disk (box 16*b*1*g*) which enables the packaging of a course onto a diskette or other storage means for students or teachers.

Students Sub-module (Box 16*b*2)

Upon selection of the students sub-module (box 16*b*2), the names of each student including the last name, first name, user name and user ID number are displayed (box 16*b*2*a*, box 16*b*2*b*) within a list. Further sub-modules may allow the teacher to add students to the student list (box 16*b*2*c*), delete students from the student list (box 16*b*2*d*) and display details concerning a student's performance (box 16*b*2*e*) with further sub-modules enabling a student's average to be calculated (box 16*b*2*e*1) and/or review student self-evaluation (box 16*b*2*e*2). Still further, sub-modules may be provided including a read disk sub-module (box 16*b*2*f*) which allows teachers to read a student's disk containing student's self-tests, exams, answers, mail, etc., a write disk sub-module (box 16*b*2*g*) which allows the teacher to create a student disc which the student can use to work on a machine not connected to the teaching machine, an update sub-module (box 16*b*2*h*) which allows the teacher to update a summary of student data (used in student analysis), a view student work sub-module (box 16*b*2*i*) which allows the teacher to view and analyse a student's work and, a class average sub-module (box 16*b*2*j*) which allows the teacher to calculate and publish class averages.

In particular, and with respect to the review student self evaluation sub-module (box 16*b*2*e*2) graphs providing information concerning a particular student's performance with respect to a particular test, their attempts at questions etc. may be displayed for review and recording by the teacher.

With respect to the add student sub-module (box 16*b*2*c*) students may be added manually from a student disk created by a teacher, from an enrollment disk/file created and/or provided by the administration module (box 12) or by other means such as the Internet.

With respect to the class average sub-module (box 16*b*2*j*), the teacher may graph the student's average for questions pertaining to a particular section of text.

Exams Sub-module (Box 16*b*3)

Upon selection of the exams sub-module (box 16*b*3), a list of exams and relevant exam information is displayed including exam ID (box 16b3a), teacher ID (box 16b3b), creation date (box 16b3c), modification date (box 16b3d), publication date (box 16b3e), and published data (box 16b3f).

In addition, the teacher may execute additional sub-modules including a new exam sub-module (box 16b3g) allowing the creation of a new exam, an edit exam sub-module (box 16b3h) allowing an existing exam to be reviewed or edited, a delete exam sub-module (box 16b3i), allowing an exam to be deleted, a publish exam sub-module (box 16b3j) allowing a teacher to make an exam available to students, a make disk sub-module (box 16b3k) allowing a disk to be created with a chosen exam data set on it, a read disk sub-module (box 16b3l) allowing the teacher to read in an exam disk, a stats sub-module (box 16b3m) allowing statistics on the exam to be computed (statistics may include information such as the number of students who have submitted answers, their grades etc.), a grade sub-module (box 16b3n) allowing teachers to grade the exams.

Figure 5A:
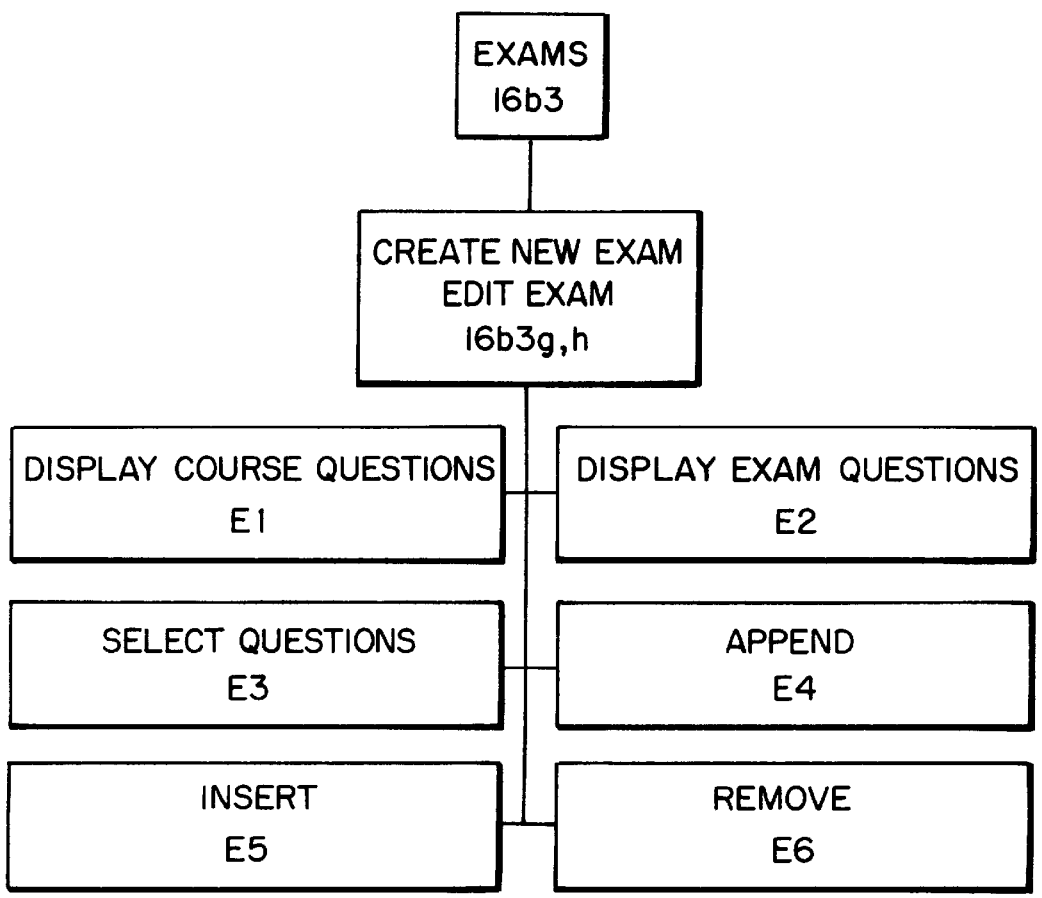
FIG. 5A is a block diagram of the exams sub-module of the teaching module in accordance with the invention.
Figures 1, 6:
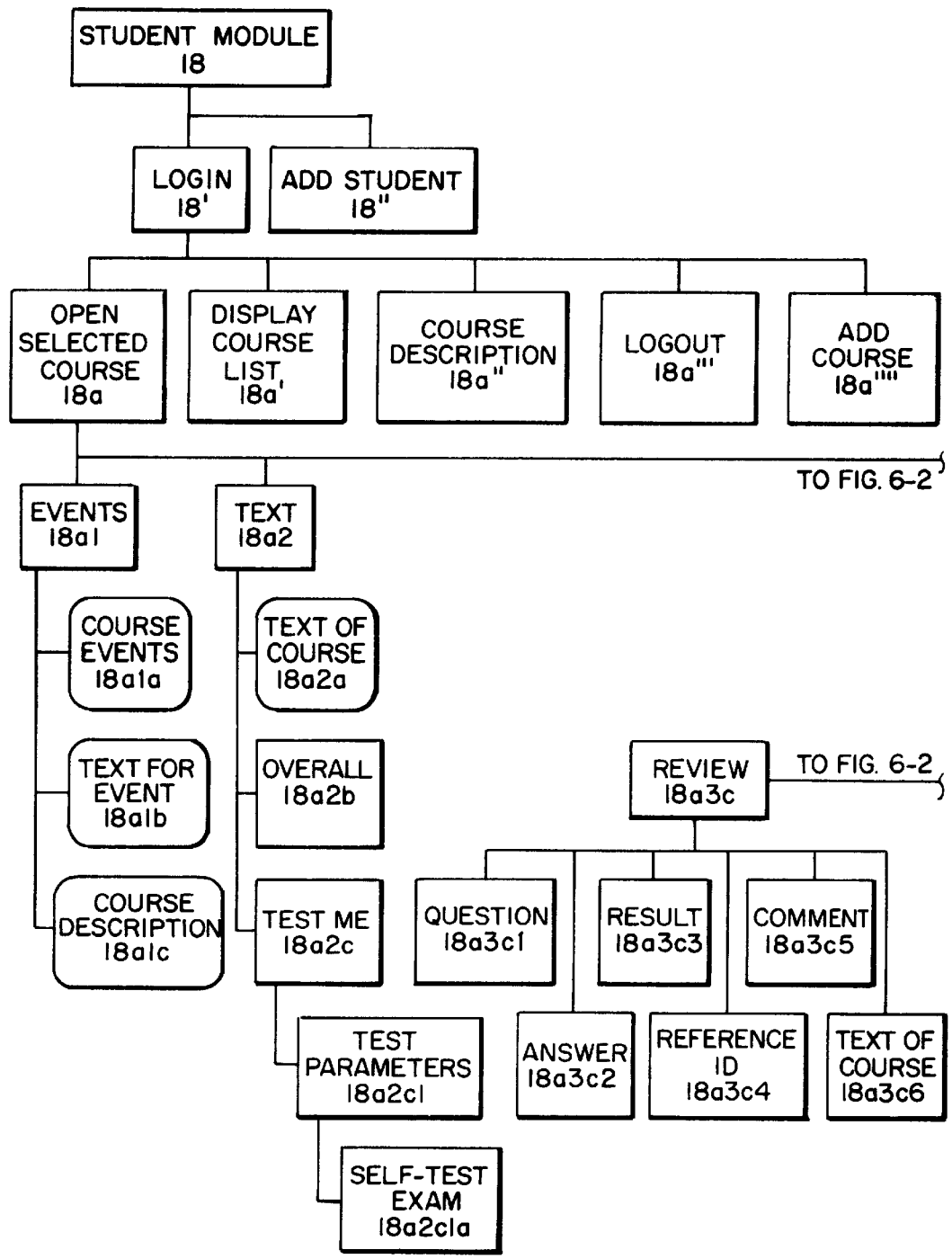
FIG. 6 is a block diagram of the student module in accordance with the invention.
Figures 2, 6:
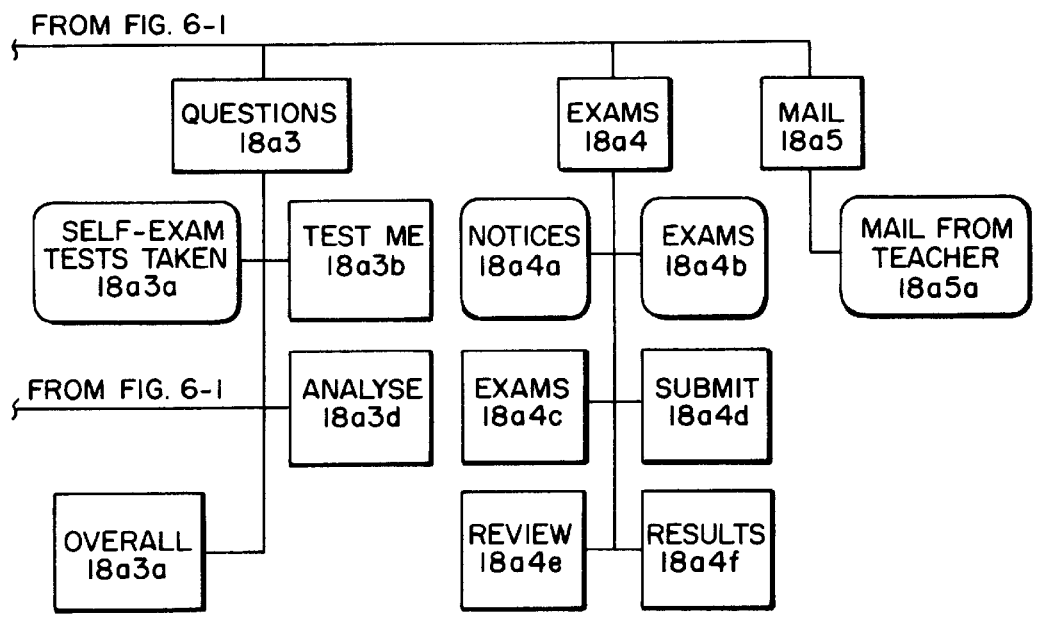

Creating a New Exam or Modifying an Existing Exam (box 16b3g, box 16b3h) (FIG. 5A)

With respect to creating a new exam/test or modifying an existing exam/test, the teacher executes various sub-modules enabling questions to be selected and presented in an exam format.

In creating an exam, questions from a course (box E1) and questions selected by the teacher (box E2) are displayed. The teacher may select questions (box E3) from the available questions (box El) either manually or automatically. For example, the select questions sub-module (box E3) may permit a teacher to automatically select 5 questions randomly from Chapter 2 of a specific course.

The displayed exam questions (box E2) will preferably also display the question ID number, the test sequence number, the type of question in addition to the text of the question.

Further sub-modules enable the teacher to append (box E4) or insert (box E5) highlighted questions from the displayed course questions (box E1) to the displayed exam questions (box E2) or alternatively, delete highlighted questions (box E6) from the questions in text field.

Statistics Sub-module and Analysis Sub-module (Box 16b3m and Box 16b4)

With respect to the statistics sub-module, sub-modules may be implemented for analysing data generated during use of the EBLS for students and the tests and self-evaluation tests written. For example, the statistics and analysis sub-modules may include additional sub-modules enabling the teacher to:

1) view the number of students who have submitted answers, the number of answers submitted and/or the grading;
2) view the number of exams submitted by a student;
3) analyse questions with respect to correct answers, incorrect answers and averages;
4) analyse questions on the basis of a single student, a group of students or all students;
5) view individual exams of students on a question by question basis;
6) view student exams at the same time to allow comparisons between student's exams;
7) divide students into groups based on their averages for tests;
8) analyse students with respect to the number of questions they have attempted, areas of the text they have been tested on, and/or their average for questions or text sections compared to the average of other student groups or all other students;
9) analyse the text with respect to the performance of each student in an exam, that is, the student's averages for a particular section of text that is tested in the exam; and,
10) analyse the text with respect to the performance of groups of students or all students in an exam or all exams.

Analysis Sub-module (Box 16b4)

Upon selection of the analysis sub-module (box 16b4), a display of the number of students (box 16b4a), the student ID (box 16b4b), the student names (box 16b4c), the accessibility (box 16b4d) and the updated date (box 16b4e) may be presented. Further functionality as detailed for the statistics sub-module (box 16b3m) may also be provided. Still further, sub-modules may include a view students sub-module (box 16b4f) enabling data pertaining to students to be displayed, an update students sub-module (box 16b4j) enabling analysis data to be updated, a questions sub-module (box 16b4g) enabling analysis of questions showing selected groups of students' averages for each question and a text sub-module (box 16b4h) enabling analysis of text as described above.

Mail Sub-Module (Box 16b5)

The EBLS and teaching module is preferably provided with functionality to allow a teacher to send and receive e-mail to/from students and administrators.

Student Module 18

The student module (box 18) is generally concerned with allowing a student to access published courses, study those courses and take exams with respect to those courses.

The student module includes a login sub-module (box 18') allowing a student to enter a user name and password in order to gain access to the student module. An add student sub-module (box 18") may also be provided to permit new students to be added to a specific computer machine or network of computers with appropriate authorization.

Once logged in, published courses are displayed (box 18a') along with a course description (box 18a"). Each course may be individually selected by the student. Additional sub-modules allowing a student to open a selected course (box 18a), add a course from a disk, CD or Internet source (box 18a") or logout (box 18a'") may also be provided.

Execution of the open selected course sub-module (box 18a) presents the student with further sub-modules such as an events sub-module (box 18a1) which provides the student with information concerning course events, a text sub-module (box 18a2) which allows the student to review, study and initiate self-testing on the course material, a questions sub-module (box 18a3) which allows a student to set up, initiate and review self-testing, an exams sub-module (box 18a4) allowing a student to write, submit and review exams as prepared by a teacher and a mail sub-module (box 18a5) allowing a student to communicate with the teacher or other students by e-mail.

Events Sub-module (box 18a1)

The events sub-module (box 18a1) will preferably display information such as a list of course events (box 18a1a), the text of events (such as the time/date of exams) (box 18a1b) and/or a course description (box 18a1c).

Text Sub-module (box 18a2)

Within the text sub-module (box 18a2a), the text of the course is displayed which allows the student to read and study the material of the course. Additional sub-modules are provided to permit the student to initiate a self-examination test (box 18a2c) and for allowing the student to view their performance on past self-examination tests for each section of the text (box 18a2b). Other sub-modules may also allow the student to view their average for each particular section of text (that is, an assessment of their level of understanding of the text based on their work on the EBLS). Further sub-modules may also be added which allow the student to make notes in particular sections of text and/or the ability of students to share/email their comments on particular sections of the text.

Within the self-test sub-module (box 18a2c), test parameters (box 18a2c1) may be set prior to taking a self-test exam (box 18a2c1a).

Questions Sub-module (box 18a3)

Upon selecting the questions sub-module (box 18a3), the student may review self-exam tests taken (box 18a3a) in a step-wise manner, initiate a new self-evaluation test (box 18a3b), review their performance in a specific self-evaluation test (box 18a3c), examine the results of a self-evaluation test (box 18a3d) or view their overall knowledge of the text (box 18a3e).

In initiating a new self-evaluation test (box 18a3b), the student may select parameters for the test: These may include:

a) the type of test (that is, general, exam like);
b) the type of questions;
c) the areas of the text covered (chapters, other sections, or particular sections);
d) a time limit;
e) the number of questions;
f) the percentage of different questions; and/or
g) questions which the student has attempted before, has not attempted before or has gotten wrong before.

After setting the course parameters, a self-evaluation test is initiated wherein a self-evaluation test screen is presented with a question field and an answer field. Options include the ability to scroll to the beginning or end of the test or the previous or next question as well as to accept an answer or change an answer. As indicated above questions may be presented requiring a single word answer or providing multiple choice.

Upon the completion of a self-evaluation test, a student may review the results of the test in a variety of graphical forms such as bar or line graphs for specific tests or overall results from a number of tests.

Review Test/Exam

Within the review sub-module (box 18a3c) the student may also review a test/exam wherein additional sub-modules presenting the question asked (box 18a3c1), the answer provided by the student (box 18a3c2), the correctness of the answer (right or wrong) (box 18a3c3), the identification of the text of the reference where the right answer is found (box 18a3c4), any comments (box 18a3c5) and the text of the reference containing the right answer (box 18a3c6). Within the review test/exam sub-module (box 18a3c), the student has the ability to scroll to the beginning or end of the test or the previous or next question thereby displaying the appropriate question and response and highlighted text from the reference showing the source of the appropriate answer. Similarly, the student may also scroll through different references as well as the text of the selected reference.

Analyse Self-exams (Box 18a3d)

Students may also view an analysis of their performance for a particular self-exam (box 18a3d). This sub-module presents the student with a graph of the sections of the text covered by the self-exam, as well as the number of questions asked on each particular section, as well as their average for all questions in a particular section(s). Accordingly, students can use this data to determine which areas of the text they did not do well in. Students may also obtain an analysis of their performance based on all of their self-exams (box 18a3e) and/or an analysis of all sections of the text (not just those on which they have answered questions) so they can determine their overall competence for the whole text.

Exams Sub-module (box 18a4)

Upon selecting the exams sub-module (box 18a4), additional sub-modules may be executed enabling a student to take exams (box 18a4c), submit exams (box 18a4d) enabling the submission of an exam to the teacher either directly, via diskette or Internet, a review exam sub-module (box 18a4e) enabling a student to review exams for which results have been received and a results sub-module (box 18a4f) enabling a student to analyse their performance in an exam as may be related to text sections.

Furthermore, it is preferable that any notices pertaining to exams are displayed (box 18a4a) along with an exam list (box 18a4b) listing available exams by exam ID number, date, Exam Title, Exam Status and Exam grade.

Mail Sub-module (box 18a5)

A mail sub-module (box 18a5) is preferably provided to enable the student to receive mail from the teacher or other students (box 18a5a).

Question Data Course

Within a textbook, there are an identifiable number of facts or opinion contained within the textbook which, although subjective can be generally quantified when subjected to independent review by persons qualified to review such a textbook for these facts and/or opinions. Accordingly, if a series of questions, answers and links within a textbook is developed as described within the authoring module, a determination of the percentage number of questions and answers relevant to the total number of facts and/or opinions can be made. Hence, a textbook can be graded on the basis of this percentage number wherein the greater the percentage of questions/answers to the total number of facts/opinions can be used to determine the relative quality or grade of a textbook as may be defined within Table 1.

TABLE 1

Question Data Course Grading

| Grade | % question/answers to total |
|-------|------------------------------|
| 1 | 85% or more |
| 2 | 65%–84% |
| 3 | 51%–64% |

Accordingly, a question data course (QDC) can be defined as a textbook containing a plurality of questions and answers specifically linked to sections of the textbook wherein the number of questions and answers relative to the total number of facts/opinions within the textbook exceeds 50% of the total number of facts/opinions within the textbook as independently determined.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

What is claimed is:

1. An evaluation based learning system (EBLS) comprising:

a course, the course including:

at least one multimedia element;

at least one identifier within the multimedia element identifying specific information within the multimedia element; and at least one question and course answer relating to specific information within the multimedia element, wherein each question and course answer are linked to an identifier identifying specific information relevant to the question and course answer, and wherein each of the at least one question and course answer includes a question, a right answer and at least one wrong answer.

2. An EBLS as in claim 1 wherein the course includes a computer database of questions and course answers operatively connected to respective identifiers.

3. An EBLS as in claim 1 further comprising a student module operatively linked to the course, the student module enabling a student to study and answer at least one question from the course, the student module including:

means for reviewing the multimedia element;

means for accessing the question;

means for submitting a student answer to the question; and means for comparing the student answer with the course answer to determine the correctness of the student answer.

4. An EBLS as in claim 3 wherein the student module includes means for reviewing the correctness of the student answer, wherein the means for reviewing includes means for displaying the text of the multimedia element related to a connected question.

5. An EBLS as in claim 3 wherein the student module includes means for taking a self-test exam from the database of questions.

6. An EBLS as in claim 3 wherein the student module includes means for analysing a student's performance in a self-test exam on the basis of the number of questions answered correctly and incorrectly relative to particular sections of the course.

7. An EBLS as in claim 1 wherein the multimedia element is selected from any one of or a combination of a text element, audio element, video element or graphic element.

8. An EBLS as in claim 1 further comprising a teaching module, the teaching module including:

means for creating an exam from the course; and means for distributing the exam to a student module.

9. An EBLS as in claim 8 further comprising means for receiving answers to an exam from a student module.

10. An EBLS as in claim 9 wherein the teaching module includes means for analysing the performance of students on exams.

11. An EBLS as in claim 1 further comprising an authoring module for the creation of a course, the authoring module including means for creating a new course wherein the means for creating a new course includes:

means for editing the at least one multimedia element;

means for creating identifiers within the multimedia element;

means for creating questions and course answers;

means for linking each question and course answer to an identifier.

12. An EBLS as in claim 11 further comprising means for publishing the course.

13. An EBLS as in claim 1 further comprising an administration module operatively linked to the course, the administration module including means for publishing and distributing the course.

14. An EBLS as in claim 13 wherein the EBLS includes a teaching module and the administration module including means for authorizing teachers to access the teaching module.

15. An EBLS as in claim 13 wherein the EBLS includes a student module and the administration module includes means for enrolling students to the student module.

16. An EBLS as in claim 14 wherein the EBLS includes means for receiving and processing grades from the teaching module.

17. An EBLS as in claim 2 further comprising a student module, teaching module and authoring module operatively linked to the course, the student module including means for reviewing the multimedia element;

means for accessing the question;

means for submitting a student answer to the question; and means for comparing the student answer with the course answer to determine the correctness of the student answer;

a teaching module including means for creating an exam from the database of course questions; and means for distributing the exam to the student module; and an authoring module including means for creating or editing a course wherein the means for creating or editing a course includes means for editing the at least one multimedia element;

means for creating identifiers within the multimedia element;

means for creating questions and course answers; and means for linking a question and course answer to an identifier.

18. A method of creating a course having at least one multimedia element, at least one identifier within the multimedia element identifying specific information within the multimedia element and at least one question and course answer relating to specific information within the multimedia element, wherein each question and course answer are linked to an identifier identifying specific information relevant to the question and course answer, and wherein each of the at least one question and course answer includes a question, a right answer and at least one wrong answer comprising the steps of:

a) reviewing the multimedia element;

b) determining substantially the total number of facts/opinions within the multimedia element;

c) establishing question and course answers relating to specific information within the multimedia element wherein each question and course answer are linked to an identifier identifying specific information relevant to the facts/opinions; and d) providing a grading of the course on the basis of a percentage of the number of linked questions and answers from step c) relative to the total number of facts/opinions from step b).

* * * * *